(12) United States Patent
Luo et al.

(10) Patent No.: US 12,266,373 B2
(45) Date of Patent: Apr. 1, 2025

(54) METHOD AND APPARATUS FOR AUDIO PROCESSING, ELECTRONIC DEVICE AND STORAGE MEDIUM

(71) Applicant: BEIJING XIAOMI MOBILE SOFTWARE CO., LTD., Beijing (CN)

(72) Inventors: Mingshuang Luo, Beijing (CN); Fangjun Kuang, Beijing (CN); Liyong Guo, Beijing (CN); Long Lin, Beijing (CN); Wei Kang, Beijing (CN); Zengwei Yao, Beijing (CN); Povey Daniel, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 355 days.

(21) Appl. No.: 18/078,483

(22) Filed: Dec. 9, 2022

(65) Prior Publication Data
US 2023/0386483 A1    Nov. 30, 2023

(30) Foreign Application Priority Data
May 31, 2022  (CN) .......................... 202210616304.5

(51) Int. Cl.
  *G10L 19/008*  (2013.01)
  *G10L 25/30*  (2013.01)
(52) U.S. Cl.
  CPC ............ *G10L 19/008* (2013.01); *G10L 25/30* (2013.01)
(58) Field of Classification Search
  CPC ....... G10L 19/008; G10L 25/30; G10L 15/16; G06N 3/04; G06N 3/09
  See application file for complete search history.

(56) References Cited

U.S. PATENT DOCUMENTS 11,302,331 B2 *  4/2022  Gowda ................. G06N 3/045
11,646,017 B1 *  5/2023  Shi ........................... G06N 3/08
                                                          704/232

(Continued)

FOREIGN PATENT DOCUMENTS

CN         1598925 A       3/2005
CN       103596010 A       2/2014

(Continued)

OTHER PUBLICATIONS

Extended European Search Report of 22216709.0 dated Sep. 12, 2023, 12 pages.

(Continued)

*Primary Examiner* — Abul K Azad
(74) *Attorney, Agent, or Firm* — Arch & Lake LLP

(57) ABSTRACT

A method and apparatus for audio processing, an electronic device and a storage medium are provided. The method includes: obtaining an audio encoding result, wherein each element in the audio encoding result has a coordinate in an audio frame number dimension and a coordinate in a text label sequence dimension; in response to an output result of an $i^{th}$ frame in a decoding path being a non-null character, respectively increasing the coordinate in the audio frame number dimension and the coordinate in the text label sequence dimension corresponding to an output position of the $i^{th}$ frame by 1 to obtain an output position of a $(i+1)^{th}$ frame in the decoding path; and determining an output result corresponding to the output position of the $(i+1)^{th}$ frame according to the output result of the $i^{th}$ frame in the decoding path and an element of the $(i+1)^{th}$ frame in the audio encoding result.

20 Claims, 3 Drawing Sheets

Audio encoding result is obtained, wherein each element in the audio encoding result has a coordinate in an audio frame number dimension and a coordinate in a text label sequence dimension — S101

In response to that an output result of an $i^{th}$ frame in a decoding path is a non-null character, the coordinate in the audio frame number dimension and the coordinate in the text label sequence dimension corresponding to an output position of the $i^{th}$ frame are respectively increased by 1 to obtain an output position of a $(i+1)^{th}$ frame in the decoding path, wherein i is an integer greater than or equal to 1 — S102

Output result corresponding to the output position of the $(i+1)^{th}$ frame in the decoding path is determined according to the output result of the ith frame in the decoding path and an element of the $(i+1)^{th}$ frame in the audio encoding result — S103

(56) References Cited

U.S. PATENT DOCUMENTS

| | | | |
|---|---|---|---|
| 2012/0127002 A1 | 5/2012 | Shibahara et al. | |
| 2014/0112527 A1 | 4/2014 | Nister et al. | |
| 2020/0089965 A1* | 3/2020 | Hollander | G06V 20/41 |
| 2024/0428786 A1* | 12/2024 | Hu | G10L 15/22 |

FOREIGN PATENT DOCUMENTS

| | | |
|---|---|---|
| CN | 107680580 A | 2/2018 |
| CN | 113362812 A | 9/2021 |
| CN | 114402593 A | 4/2022 |
| CN | 115035902 A | 9/2022 |

OTHER PUBLICATIONS

Kang et al., arXiv:2211.0048v1, Fast and parallel decoding for transducer, Oct. 31, 2022, 5 pages.

Tripathi et al., Monotonic Recurrent Neural Network Transducer and Decoding Strategies, ASRU 2019, 5 pages.

"Development History of Speech Recognition Technology", China Science Journal, 14th edition, Aug. 22, 2014, China. Internet (4p).

Yanzhang He, et al., "Streaming end-to-end speech recognition for mobile devices", arXiv:1811.06621v1 [cs.CL], Nov. 15, 2018, Google, Inc., USA, (5p).

Mahaveer Jain, et al., "Rnn-t for latency controlled asr with improved beam search", arXiv:1911.01629v2 [cs.CL], Jan. 16, 2020, Facebook AI, USA, (5p).

Rohit Prabhavalkar, et al., "Less is more: Improved rnn-t decoding using limited label context and path merging", arXiv:2012.06749v1 [cs.CL], Dec. 12, 2020, Google, USA, (5p).

Juntae Kim, et al. "Accelerating RNN Transducer Inference via One-Step Constrained Beam Search", arXiv preprint arXiv:2002.03577, 2020, (5p).

Yanfei Shen et al., "High Efficiency Video Coding," Chinese Journal of Computers, vol. 36 No. 11, Nov. 2013, (16p).

The First Office Action issued in CN Application No. 202210616304.5 dated Jan. 10, 2025 with English Translation, (12p).

* cited by examiner

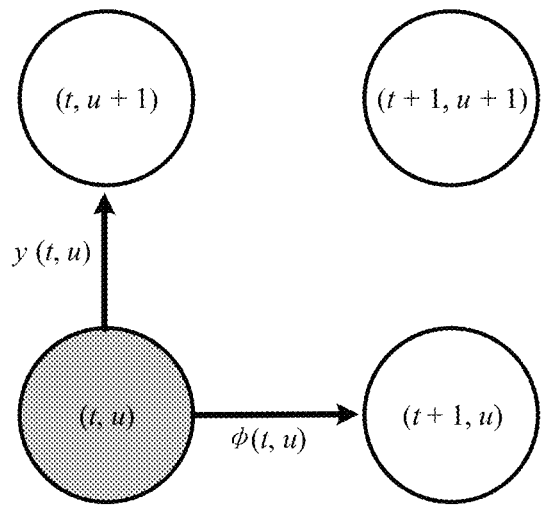

FIG. 3

| | |
|---|---|
| Training audio data and a text label corresponding to the training audio data are input to the neural network model to obtain a second joint result output by the neural network model, wherein each element in the second joint result has a coordinate in the audio frame number dimension and a coordinate in the text label sequence dimension and a probability value of each character type | S401 |
| All first training paths in the second joint result are determined, wherein in each of the all first training paths, each frame corresponds to a serial number, in response to that an output result of an $i^{th}$ frame is a non-null character, the coordinate in the audio frame number dimension and the coordinate in the text label sequence dimension corresponding to an output position of the $i^{th}$ frame are respectively increased by 1 to obtain an output position of a $(i+1)^{th}$ frame, and in response to that the output result of the $i^{th}$ frame is a null character, the coordinate in the audio frame number dimension corresponding to the output position of the $i^{th}$ frame is increased by 1 to obtain the output position of the $(i+1)^{th}$ frame | S402 |
| Network parameters of the neural network model are adjusted according to a sum of probability values of the all first training paths | S403 |

FIG. 4

METHOD AND APPARATUS FOR AUDIO PROCESSING, ELECTRONIC DEVICE AND STORAGE MEDIUM

This application is based upon and claims priority to Chinese Patent Application No. 202210616304.5, filed May 31, 2022, the entire content of which is incorporated herein by reference for all purposes.

TECHNICAL FIELD

The present disclosure relates to the field of audio processing technologies, and in particular to a method and apparatus for audio processing, an electronic device and a storage medium.

BACKGROUND

Recently, audio processing technologies such as audio recognition have been developing gradually. With an increasing accuracy, the audio processing technologies have played a substantial role in many fields. Currently, the field of audio processing includes connectionist temporal classification (CTC) technologies, attention-based model technologies and Recurrent Neural Network transducer (RNN-T) technologies, wherein the RNN-T technologies have the best effect in practice. However, in the related art, when the RNN-T technologies are used for audio processing, an amount of computation is relatively large and a lot of memory is occupied, which makes it impossible to achieve parallel and fast calculation, thereby greatly reducing the application of the RNN-T technologies.

SUMMARY

The present disclosure provides a method and apparatus for audio processing, an electronic device and a storage medium to solve the problems in the related art.

According to a first aspect of the present disclosure, there is provided a method for audio processing, including:
- obtaining an audio encoding result, wherein the audio encoding result includes a plurality of elements, and each element in the audio encoding result has a coordinate in an audio frame number dimension and a coordinate in a text label sequence dimension;
- in response to that an output result of an $i^{th}$ frame in a decoding path is a non-null character, respectively increasing the coordinate in the audio frame number dimension and the coordinate in the text label sequence dimension corresponding to an output position of the $i^{th}$ frame by 1 to obtain an output position of a $(i+1)^{th}$ frame in the decoding path, wherein i is an integer greater than or equal to 1; and
- determining an output result corresponding to the output position of the $(i+1)^{th}$ frame in the decoding path according to the output result of the $i^{th}$ frame in the decoding path and an element of the $(i+1)^{th}$ frame in the audio encoding result.

According to a second aspect of the present disclosure, there is provided an electronic device, including a memory and a processor, wherein the memory is configured to store computer instructions executable on the processor, and when executing the computer instructions, the processor is configured to perform the method according to the first aspect.

According to a third aspect of the embodiments of the present disclosure, there is provided a computer readable storage medium storing a computer program, wherein the computer program, when executed by a processor, causing the processor to implement the method described in the first aspect.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 3 is a schematic diagram illustrating output position switching between adjacent frames in the related art.

FIG. 4 is a flowchart illustrating a method for training a neural network model according to an embodiment of the present disclosure.

DETAILED DESCRIPTION OF THE EMBODIMENTS

Figure 1:
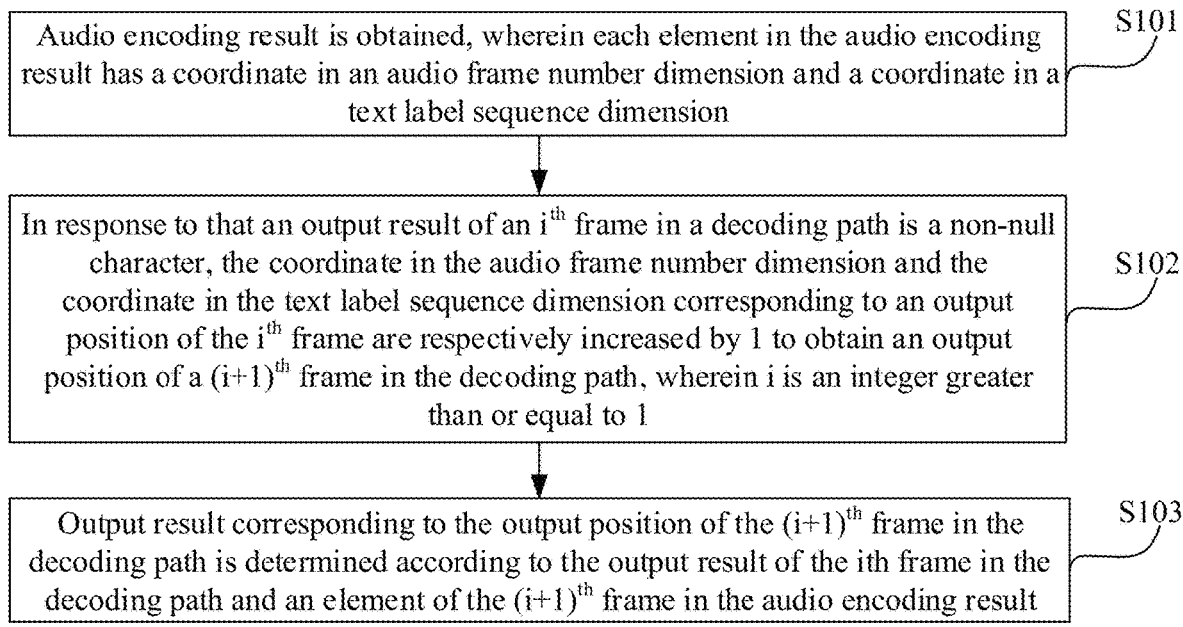
FIG. 1 is a flowchart illustrating a method for audio processing according to an embodiment of the present disclosure.

Embodiments will be described in detail here, examples of which are illustrated in the accompanying drawings. When the following description refers to the drawings, unless otherwise indicated, the same numerals in different drawings indicate the same or similar elements. The implementations set forth in the following description of embodiments do not represent all implementations consistent with the embodiments of the present disclosure. Instead, they are merely examples of apparatuses and methods consistent with aspects related to the embodiments of the present disclosure as recited in the appended claims.

Terms used in the embodiments of the present disclosure are only used for the purpose of describing specific embodiments and not intended to limit the embodiments of the present disclosure. The singular forms "a", "one" and "the" used in the present disclosure and the appended claims are also intended to include plural forms, unless the context clearly indicates other meanings. It should also be understood that the term "and/or" as used in the present disclosure refers to and includes any and all possible combinations of one or more of the associated listed items.

It should be understood that, although terms first, second, third and the like may be used to describe various information in the embodiments of the present disclosure, the information should not be limited to these terms. These terms are only used to distinguish the same type of information. For example, first information may also be referred to as second information, and similarly, the second information may also be referred to as the first information without departing from the scope of the embodiments of the present disclosure. For example, terms "if" and "in case of" used herein may be explained as "while" or "when" or "responsive to determining", which depends on the context.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Up to now, the field of speech recognition has developed for decades, that is, from an initial sequence similarity matching to a modeling based on Gaussian mixture model and hidden Markov model, and a later developed hybrid system based on a neural network. For decades, it is very complicated to build a speech recognition system, and a complicated data alignment process is needed before building a model. In recent years, an end-to-end model has entered a high-speed development stage. The end-to-end model can not only greatly simplify a modeling process of the speech recognition, that is, remove the complicated data alignment process, but also achieve better recognition results.

Generally speaking, there are three kinds of models to implement the end-to-end model, namely, a connectionist temporal classification (CTC), an attention-based model, and a RNN transducer (RNN-T). Among these three kinds of models, the CTC and the RNN-T are natural streaming models, which can be used for frame synchronization decoding. However, the attention-based model needs some additional modifications to achieve streaming decoding. These modifications are not only troublesome, but also will lose some recognition accuracy. Among the CTC model and the RNN-T model, the CTC model has a premise that frames are statistically independent, so it is difficult for the CTC model to achieve excellent recognition rate without adding external language models. Therefore, considering all aspects, the RNN-T model is more useful in production practice.

In the process of application and training, the RNN-T model needs to determine a decoding path on a plane composed of an audio frame number dimension and a text label sequence dimension. In the process of determining the decoding path, the switching of frame number and text label sequence number is relatively random and comprehensive, and lacks necessary restrictions, therefore, the amount of computation is relatively large and a lot of memory is occupied, which makes it impossible to realize parallel and fast calculation, thereby greatly reducing the practicability of the RNN-T technologies.

Based on this, according to a first aspect of the embodiments of the present disclosure, there is provided a method for audio processing. Referring to FIG. 1, it shows a flow of the method. The method for audio processing includes steps S101 to S103.

The method can use the neural network to process audio to be processed, for example, the RNN-T model. The RNN-T model usually consists of three parts, namely, an encoder network, a prediction network and a joiner network. This method can be applied to scenarios generated by text label sequences such as speech recognition, lip recognition and machine translation.

In step S101, an audio encoding result is obtained, wherein each element in the audio encoding result has a coordinate in an audio frame number dimension and a coordinate in a text label sequence dimension.

Audio data to be processed can be encoded through an encoder network of a neural network model to obtain the audio encoding result. The audio encoding result can be in a form of feature vectors. For example, if the audio frame number dimension is T, the text label sequence dimension is U, and then the audio encoding result can be a feature vector with dimensions of (T, U). In the audio encoding result, an element with a coordinate (t, u) represents a feature vector when audio data of a $t^{th}$ frame is an $u^{th}$ text label.

The audio encoding result is used to search a decoding path in the decoding process. By searching the decoding path, an output position of each frame can be determined in a plane composed of the audio frame number dimension and the text label sequence dimension, and an output result of each frame can be determined. The output position can be identified by a serial number on the text label sequence dimension, and the output result can be represented by a character type of a text label corresponding to the output position, wherein the character type can be a specific character or a null character. After the decoding path is obtained, a target text, that is, a result of speech recognition, can be generated according to the output position and output result of each frame on the decoding path.

In step S102, in response to that an output result of an $i^{th}$ frame in a decoding path is a non-null character, the coordinate in the audio frame number dimension and the coordinate in the text label sequence dimension corresponding to an output position of the $i^{th}$ frame are respectively increased by 1 to obtain an output position of a $(i+1)^{th}$ frame in the decoding path, wherein i is an integer greater than or equal to 1.

Figure 2:
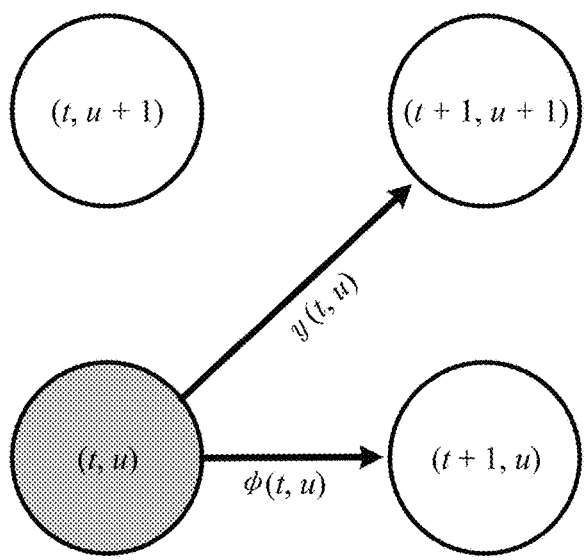
FIG. 2 is a schematic diagram illustrating output position switching between adjacent frames according to an embodiment of the present disclosure.

The $i^{th}$ frame can be each frame in the decoding path. The fact that the output result of the $i^{th}$ frame in the decoding path is the non-null character means that the output result of the $i^{th}$ frame in the decoding path is a specific character other than the null character. Referring to FIG. 2, it shows a process of switching the output position of the $i^{th}$ frame to the output position of the $(i+1)^{th}$ frame in response to that the output result of the $i^{th}$ frame is the non-null character, that is, switching from (t, u) to (t+1, u+1) diagonally. It should be understood that, in the related art, in response to that the output result of the $i^{th}$ frame is the non-null character, the coordinate in the text label sequence dimension corresponding to an output position of the $i^{th}$ frame is increased by 1 to obtain the output position of the $(i+1)^{th}$ frame (referring to FIG. 3, it shows a process of switching the output position of the $i^{th}$ frame to the output position of the $(i+1)^{th}$ frame in response to that the output result of the $i^{th}$ frame is the non-null character in the related art, that is, switching from (t, u) to (t, u+1)), thereby reducing the amount of computation in the decoding process, and improving the decoding efficiency.

In addition, in response to that the output result of the $i^{th}$ frame in the decoding path is a null character, the coordinate in the audio frame number dimension corresponding to the output position of the $i^{th}$ frame is increased by 1 to obtain the output position of the $(i+1)^{th}$ frame in the decoding path. Referring to FIG. 2, it shows a process of switching the output position of the $i^{th}$ frame to the output position of the $(i+1)^{th}$ frame in response to that the output result of the $i^{th}$ frame is the null character, that is, switching from (t, u) to (t+1, u).

The number of the output position of each frame can also be limited in the process of searching the decoding path, that is, the number of the text label of each frame can be limited, for example, the output position of each frame can be limited to 1, so that different samples in one batch can be decoded in parallel. As an example, when a number of the output position of the $i^{th}$ frame in the decoding path is 1, in response to that an output result of the $i^{th}$ frame in the decoding path is the non-null character, the coordinate in the audio frame number dimension and the coordinate in the text label sequence dimension corresponding to the output position of the $i^{th}$ frame are respectively increased by 1 to obtain the output position of the $(i+1)^{th}$ frame in the decoding path; when a number of the output position of the $i^{th}$ frame in the decoding path is 1, in response to that the output result of the $i^{th}$ frame in the decoding path is the null character, the coordinate in the audio frame number dimension corresponding to the output position of the $i^{th}$ frame is increased by 1 to obtain the output position of the $(i+1)^{th}$ frame in the decoding path. Limiting the number of the output position of each frame means restricting the maximum number of labels that can be sent out in each time step. For example, limiting the number of the output position of each frame to 1 means restricting the maximum number of labels that can be sent out in each time step to 1.

In step S103, an output result corresponding to the output position of the (i+1) t frame in the decoding path is determined according to the output result of the $i^{th}$ frame in the decoding path and an element of the $(i+1)^{th}$ frame in the audio encoding result.

In a possible embodiment, first, the output result of the $i^{th}$ frame is jointed with the element of the $(i+1)^{th}$ frame in the audio encoding result through a joiner network of a neural network model to obtain a first joint result; and then the first joint result is decoded through a decoder network of the neural network model to obtain the output result of the $(i+1)^{th}$ frame.

Output results of previous i frames in the decoding path are character types (a specific character or a null character) and probability values corresponding to the character types. The output result of the $(i+1)^{th}$ frame in the decoding path includes character types (a specific character or a null character) and probability values corresponding to the character types, or a probability value of each character type in a character library.

It can be understood that when the $(i+1)^{th}$ frame is a last frame in the audio frame number dimension, a target text can be determined according to the decoding path, that is, audio recognition is completed, and a result of the audio recognition is obtained.

According to the method for audio processing provided by the present disclosure, by obtaining an audio encoding result, in response to that an output result of an $i^{th}$ frame in a decoding path is a non-null character, the coordinate in the audio frame number dimension and the coordinate in the text label sequence dimension corresponding to an output position of the $i^{th}$ frame can be respectively increased by 1 to obtain an output position of a $(i+1)^{th}$ frame in the decoding path, wherein i is an integer greater than or equal to 1; finally, an output result corresponding to the output position of the $(i+1)^{th}$ frame in the decoding path can be determined according to the output result of the $i^{th}$ frame in the decoding path and an element of the $(i+1)^{th}$ frame in the audio encoding result. Compared with the method of switching to the output position of the next frame in two steps horizontally and vertically in the related art, the method of switching to the output position of the next frame in the diagonal way in the decoding path can reduce the amount of computation in the decoding process, improve the decoding efficiency, reduce the amount of computation and memory occupation of audio processing, realize parallel and fast calculation, and improve the practicability of the RNN-T technologies.

In some embodiments of the present disclosure, a reserved number N (for example, 4) can be set in the process of searching for decoding paths, that is, N decoding paths can be reserved at the same time, and the reserved N decoding paths are decoding paths with the highest probability value. After determining the output position and output result of each frame, the N decoding paths that need to be reserved can be determined.

That is, in response to that the output result of the $i^{th}$ frame in the decoding path is the non-null character, when respectively increasing the coordinate in the audio frame number dimension and the coordinate in the text label sequence dimension corresponding to the output position of the $i^{th}$ frame by 1 to obtain the output position of the $(i+1)^{th}$ frame in the decoding path, the coordinate in the audio frame number dimension and the coordinate in the text label sequence dimension corresponding to the output position of the $i^{th}$ frame can be respectively increased by 1 to obtain an output position of a $(i+1)^{th}$ frame in the $n^{th}$ decoding path in response to that an output result of an $i^{th}$ frame in a $n^{th}$ decoding path in N decoding paths is a non-null character, wherein N is an integer greater than 1, and n is an integer greater than or equal to 1 and less than or equal to N.

That is, in response to that the output result of the $i^{th}$ frame in the decoding path is the null character, when increasing the coordinate in the audio frame number dimension corresponding to the output position of the $i^{th}$ frame by 1 to obtain the output position of the $(i+1)^{th}$ frame in the decoding path, the coordinate in the audio frame number dimension corresponding to the output position of the $i^{th}$ frame can be increased by 1 to obtain an output position of a $(i+1)^{th}$ frame in the $n^{th}$ decoding path in response to that an output result of an $i^{th}$ frame in a $n^{th}$ decoding path in N decoding paths is a null character.

That is, when determining the output result corresponding to the output position of the $(i+1)^{th}$ frame in the decoding path according to the output result of the $i^{th}$ frame in the decoding path and the element of the $(i+1)^{th}$ frame in the audio encoding result, an output result corresponding to the output position of the $(i+1)^{th}$ frame in the $n^{th}$ decoding path can be determined according to the output result of the $i^{th}$ frame in the $n^{th}$ decoding path and the element of the $(i+1)^{th}$ frame in the audio encoding result. The output result of the $i^{th}$ frame in the decoding path includes the probability value of each character type.

Based on this, after determining the output result corresponding to the output position of the $(i+1)^{th}$ frame in the $n^{th}$ decoding path (that is, after determining the output result corresponding to the output position of the $(i+1)^{th}$ frame in each of the N decoding paths), probability values of M candidate decoding branches formed by the $n^{th}$ decoding path can be determined according to output results of previous i frames and the output result corresponding to the output position of the $(i+1)^{th}$ frame in the $n^{th}$ decoding path, wherein each character type in the output result corresponding to the output position of the $(i+1)^{th}$ frame corresponds to a candidate decoding branch, and M is an integer greater than or equal to 1; and then, previous N decoding branches with the highest probability value are reserved in N×M candidate decoding branches formed by each of the N decoding paths and the N decoding paths are correspondingly updated. Therefore, after the output result of each frame is output, the decoding branches with the highest probability value can be accurately determined and reserved, so that text information corresponding to the reserved decoding paths is closest to a real text of the audio data to be processed.

In addition, before reserving the previous N decoding branches with the highest probability value in the N×M candidate decoding branches formed by each of the N decoding paths and correspondingly updating the N decoding paths, one or more null characters in each of the N×M candidate decoding branches formed by each of the N decoding paths are deleted to obtain a character string corresponding to the candidate decoding branch; and two or more candidate decoding branches with the same character string are merged, and a sum of probability values of two or more candidate decoding branches is determined as a probability value of the merged candidate decoding branch. That is, virtually identical decoding branches are merged by removing one or more null characters, so that the decoding branches are more accurate and the probability value is more accurate. For example, if a candidate decoding branch includes A, null, B, C and D, and another candidate decoding branch includes A, B, null, C and D, the two candidate decoding branches can be merged.

It can be understood that, in response to that the $(i+1)^{th}$ frame is a last frame in the audio frame number dimension, a target text can be determined according to a decoding path with the highest probability value in the reserved N decoding paths.

In this embodiment, by reserving a plurality of decoding paths in real time, and merging and updating the reserved decoding paths in real time, the decoding paths can be made more accurate and reliable. Further, by limiting the number of the reserved decoding paths, the computational load and memory occupation can also be reduced.

In some embodiments of the present disclosure, a method for training a neural network can be shown in FIG. 4. The method includes steps S401 to S403.

In step S401, training audio data and a text label corresponding to the training audio data are input to the neural network model to obtain a second joint result output by the neural network model, wherein each element in the second joint result has a coordinate in the audio frame number dimension and a coordinate in the text label sequence dimension and a probability value of each character type.

Audio data to be processed can be encoded through an encoder network of a neural network model to obtain a training encoding result, a text label can be decoded through a decoder network of the neural network model to obtain a training decoding result, and the training encoding result can be jointed with the training decoding result through a joiner network of the neural network model to obtain the second joint result.

In step S402, all first training paths in the second joint result are determined, wherein in each of the all first training paths, each frame corresponds to a serial number, in response to that an output result of an $i^{th}$ frame is a non-null character, the coordinate in the audio frame number dimension and the coordinate in the text label sequence dimension corresponding to an output position of the $i^{th}$ frame are respectively increased by 1 to obtain an output position of a $(i+1)^{th}$ frame, and in response to that the output result of the $i^{th}$ frame is a null character, the coordinate in the audio frame number dimension corresponding to the output position of the $i^{th}$ frame is increased by 1 to obtain the output position of the $(i+1)^{th}$ frame.

That is, the first training paths are searched according to a decoding path searching mode in the method for audio processing shown in FIG. 1. That is to say, in response to that the output result of the $i^{th}$ frame is the non-null character, by limiting the method of determining the output position of the $(i+1)^{th}$ frame in the first training paths and the number of serial numbers of text labels in each frame (that is, the number of the text labels), the training process and the decoding process can have the same constraint conditions, so that the model has better performance.

In step S403, network parameters of the neural network model are adjusted according to a sum of probability values of the all first training paths.

A first network loss value (for example, modified RNN-T loss) can be determined according to the sum of probability values of the all first training paths, and then the network parameters of the neural network model can be adjusted by using the first network loss value, that is, network parameters of the encoder network, the decoder network and the joiner network can be adjusted.

In the training method provided by this embodiment, by adding the same constraint conditions as the decoding process shown in FIG. 1 in the process of searching the first training paths, the decoding process and the training process can be more consistent, therefore, the performance of the trained neural network model is obviously improved.

Further, following training methods can be provided based on the training method shown in FIG. 4.

First, step S401 is executed to obtain a second joint result.

Then, for training audio data with a preset ratio (for example, 25%) in all training audio data, step S402 is executed, that is, all first training paths are determined in a second joint result of the training audio data with the preset ratio.

Then, step S403 is executed, that is, the network parameters of the neural network model are adjusted according to the all first training paths determined in a second joint result of each of the training audio data with the preset ratio.

Then, for the all training audio data, all first training paths and all second training paths are determined in a second joint result of the all training audio data, wherein in each of the all second training paths, each frame corresponds to a serial number, in response to that an output result of an $i^{th}$ frame is a non-null character, the coordinate in the text label sequence dimension corresponding to the output position of the $i^{th}$ frame is increased by 1 to obtain an output position of a $(i+1)^{th}$ frame, and in response to that the output result of the $i^{th}$ frame is a null character, the coordinate in the audio frame number dimension corresponding to the output position of the $i^{th}$ frame is increased by 1 to obtain the output position of the $(i+1)^{th}$ frame.

Finally, the network parameters of the neural network model are adjusted according to the all first training paths and the all second training paths determined in a second joint result of each of the all training audio data. As an example, a second network loss value (for example, modified RNN-T loss) can be determined according to all first training paths, a third network loss value (e.g., common RNN-T loss) can be determined according to all second training paths, and finally weighted summation can be performed on the second network loss value and the third network loss value to obtain a comprehensive network loss value, and the network parameters of the neural network model can be adjusted according to the comprehensive network loss value.

In this embodiment, the training method for the neural network shown in FIG. 4 is combined with training methods in related art, so that the training method can improve the accuracy of network loss calculation and further improve the training accuracy while fitting the decoding process.

Figure 5:
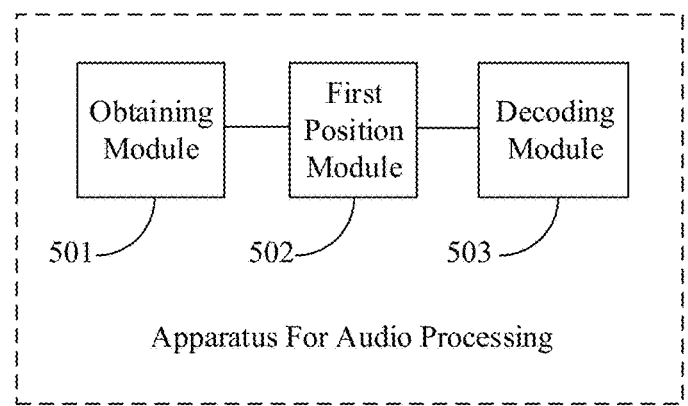
FIG. 5 is a structural schematic diagram illustrating an apparatus for audio processing according to an embodiment of the present disclosure.

According to a second aspect of the embodiments of the present disclosure, there is provided an apparatus for audio processing. Referring to FIG. 5, the apparatus for audio processing includes:

an obtaining module 501 configured to obtain an audio encoding result, wherein each element in the audio encoding result has a coordinate in an audio frame number dimension and a coordinate in a text label sequence dimension;

a first position module 502 configured to, in response to that an output result of an $i^{th}$ frame in a decoding path is a non-null character, respectively increase the coordinate in the audio frame number dimension and the coordinate in the text label sequence dimension corresponding to an output position of the $i^{th}$ frame by 1 to obtain an output position of a $(i+1)^{th}$ frame in the decoding path, wherein i is an integer greater than or equal to 1; and a decoding module 503 configured to determine an output result corresponding to the output position of the $(i+1)^{th}$ frame in the decoding path according to the output result of the $i^{th}$ frame in the decoding path and an element of the $(i+1)^{th}$ frame in the audio encoding result.

In some embodiments of the present disclosure, the apparatus for audio processing further includes a second position module configured to:

in response to that the output result of the $i^{th}$ frame in the decoding path is a null character, increase the coordinate in the audio frame number dimension corresponding to the output position of the $i^{th}$ frame by 1 to obtain the output position of the $(i+1)^{th}$ frame in the decoding path.

In some embodiments of the present disclosure, the first position module 502 is configured to:

when a number of the output position of the $i^{th}$ frame in the decoding path is 1, in response to that an output result of the $i^{th}$ frame in the decoding path is the non-null character, respectively increase the coordinate in the audio frame number dimension and the coordinate in the text label sequence dimension corresponding to the output position of the $i^{th}$ frame by 1 to obtain the output position of the $(i+1)^{th}$ frame in the decoding path; and/or the second position module is configured to:

when a number of the output position of the $i^{th}$ frame in the decoding path is 1, in response to that the output result of the $i^{th}$ frame in the decoding path is the null character, increase the coordinate in the audio frame number dimension corresponding to the output position of the $i^{th}$ frame by 1 to obtain the output position of the $(i+1)^{th}$ frame in the decoding path.

In some embodiments of the present disclosure, the first position module 502 is configured to:

in response to that an output result of an $i^{th}$ frame in a $n^{th}$ decoding path in N decoding paths is a non-null character, respectively increase the coordinate in the audio frame number dimension and the coordinate in the text label sequence dimension corresponding to the output position of the $i^{th}$ frame by 1 to obtain an output position of a $(i+1)^{th}$ frame in the $n^{th}$ decoding path, wherein N is an integer greater than 1, and n is an integer greater than or equal to 1 and less than or equal to N;

the second position module is configured to:

in response to that an output result of an $i^{th}$ frame in a $n^{th}$ decoding path in N decoding paths is a null character, increase the coordinate in the audio frame number dimension corresponding to the output position of the $i^{th}$ frame by 1 to obtain an output position of a $(i+1)^{th}$ frame in the $n^{th}$ decoding path.

In some embodiments of the present disclosure, the decoding module 503 is configured to:

determine an output result corresponding to the output position of the $(i+1)^{th}$ frame in the $n^{th}$ decoding path according to the output result of the $i^{th}$ frame in the $n^{th}$ decoding path and the element of the $(i+1)^{th}$ frame in the audio encoding result.

In some embodiments of the present disclosure, output results of previous i frames in the decoding path are character types and probability values corresponding to the character types, and the output result corresponding to the output position of the $(i+1)^{th}$ frame in the decoding path includes a probability value of each character type;

the apparatus for audio processing further includes a screening module configured to:

after determining the output result corresponding to the output position of the $(i+1)^{th}$ frame in the $n^{th}$ decoding path according to the output result of the $i^{th}$ frame in the $n^{th}$ decoding path and the element of the $(i+1)^{th}$ frame in the audio encoding result, determine probability values of M candidate decoding branches formed by the $n^{th}$ decoding path according to output results of previous i frames and the output result corresponding to the output position of the $(i+1)^{th}$ frame in the $n^{th}$ decoding path, wherein each character type in the output result corresponding to the output position of the $(i+1)^{th}$ frame corresponds to a candidate decoding branch, and M is an integer greater than or equal to 1; and in N×M candidate decoding branches formed by each of the N decoding paths, reserve previous N decoding branches with the highest probability value and correspondingly update the N decoding paths.

In some embodiments of the present disclosure, the apparatus for audio processing further includes a merging module configured to:

before in the N×M candidate decoding branches formed by each of the N decoding paths, reserving the previous N decoding branches with the highest probability value and correspondingly updating the N decoding paths, delete one or more null characters in each of the N×M candidate decoding branches formed by each of the N decoding paths to obtain a character string corresponding to the candidate decoding branch; and merge two or more candidate decoding branches with the same character string, and determine a sum of probability values of two or more candidate decoding branches as a probability value of the merged candidate decoding branch.

In some embodiments of the present disclosure, the $(i+1)^{th}$ frame is a last frame in the audio frame number dimension;

the apparatus for audio processing further includes a target module configured to:

after reserving the previous N decoding branches with the highest probability value in the N×M candidate decoding branches formed by each of the N decoding paths and correspondingly updating the N decoding paths, determine a target text according to a decoding path with the highest probability value in the N decoding paths.

In some embodiments of the present disclosure, the obtaining module 501 is configured to:

encode audio data to be processed through an encoder network of a neural network model to obtain the audio encoding result; and/or the decoding module 503 is configured to:
joint the output result of the $i^{th}$ frame with the element of the $(i+1)^{th}$ frame in the audio encoding result through a joiner network of a neural network model to obtain a first joint result; and
decode the first joint result through a decoder network of the neural network model to obtain the output result corresponding to the output position of the $(i+1)^{th}$ frame.

In some embodiments of the present disclosure, the apparatus for audio processing further includes a first training module configured to:
input training audio data and a text label corresponding to the training audio data to the neural network model to obtain a second joint result output by the neural network model, wherein each element in the second joint result has a coordinate in the audio frame number dimension and a coordinate in the text label sequence dimension and a probability value of each character type;
determine all first training paths in the second joint result, wherein in each of the all first training paths, each frame corresponds to a serial number, in response to that an output result of an $i^{th}$ frame is a non-null character, the coordinate in the audio frame number dimension and the coordinate in the text label sequence dimension corresponding to an output position of the $i^{th}$ frame are respectively increased by 1 to obtain an output position of a $(i+1)^{th}$ frame, and in response to that the output result of the $i^{th}$ frame is a null character, the coordinate in the audio frame number dimension corresponding to the output position of the $i^{th}$ frame is increased by 1 to obtain the output position of the $(i+1)^{th}$ frame; and
adjust network parameters of the neural network model according to a sum of probability values of the all first training paths.

In some embodiments of the present disclosure, when determining the all first training paths in the second joint result, the first training module is configured to:
for training audio data with a preset ratio in all training audio data, determine the all first training paths in a second joint result of the training audio data with the preset ratio;
when adjusting network parameters of the neural network model according to the sum of probability values of the all first training paths, the first training module is configured to:
adjust the network parameters of the neural network model according to the all first training paths determined in a second joint result of each of the training audio data with the preset ratio;
the apparatus for audio processing further includes a second training configured to:
for the all training audio data, determine all first training paths and all second training paths in a second joint result of the all training audio data, wherein in each of the all second training paths, each frame corresponds to a serial number, in response to that an output result of an $i^{th}$ frame is a non-null character, the coordinate in the text label sequence dimension corresponding to the output position of the $i^{th}$ frame is increased by 1 to obtain an output position of a $(i+1)^{th}$ frame, and in response to that the output result of the $i^{th}$ frame is a null character, the coordinate in the audio frame number dimension corresponding to the output position of the $i^{th}$ frame is increased by 1 to obtain the output position of the $(i+1)^{th}$ frame; and
adjust the network parameters of the neural network model according to the all first training paths and the all second training paths determined in a second joint result of each of the all training audio data.

Regarding the apparatus in the above embodiment, the specific manner in which each module performs the operation has been described in detail in the embodiment of the method in the first aspect, which will not be elaborated here.

Figure 6:
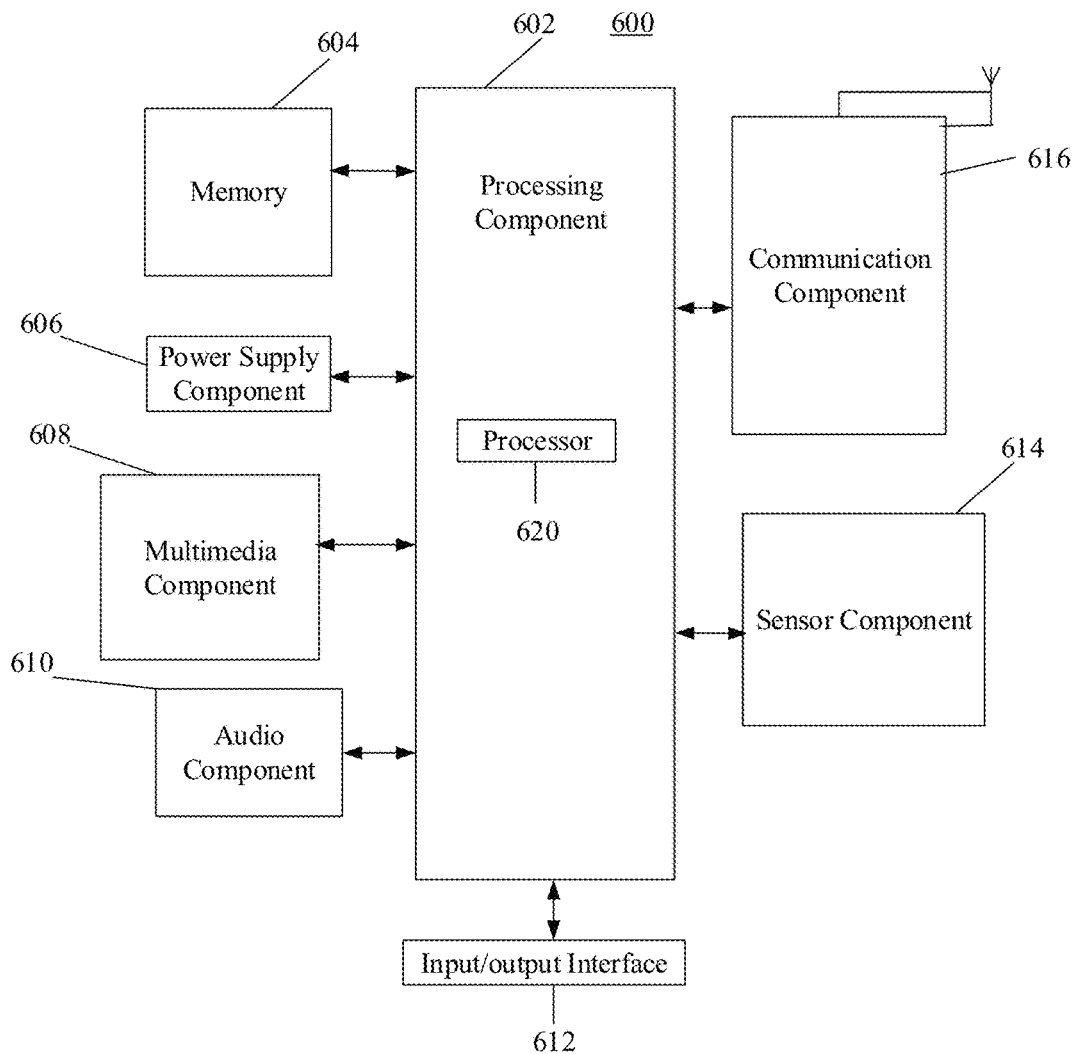
FIG. 6 is a structural block diagram illustrating an electronic device according to an embodiment of the present disclosure.

According to a third aspect of the embodiments of the present disclosure, referring to FIG. 6, it schematically shows a block diagram of an electronic device. For example, the apparatus 600 can be a mobile telephone, a computer, a digital broadcasting terminal, a message receiving and transmitting device, a game console, a tablet device, a medical device, a fitness device, a personal digital assistant, and the like.

Referring to FIG. 6, the apparatus 600 may include one or more of the following components: a processing component 602, a memory 604, a power supply component 606, a multimedia component 608, an audio component 610, an input/output (I/O) interface 612, a sensor component 614 and a communication component 616.

The processing component 602 generally controls overall operations of the apparatus 600, such as operations associated with display, phone calls, data communications, camera operations, and recording operations. The processing component 602 may include one or more processors 620 to execute instructions to complete all or part of the steps of the above methods. In addition, the processing component 602 may include one or more modules which facilitate the interaction between the processing component 602 and other components. For example, the processing component 602 may include a multimedia module to facilitate the interaction between the multimedia component 608 and the processing component 602.

The memory 604 is to store various types of data to support the operation of the apparatus 600. Examples of such data include instructions for any application or method operated on the apparatus 600, contact data, phonebook data, messages, pictures, videos, and so on. The memory 604 may be implemented by any type of volatile or non-volatile storage devices or a Combination thereof, such as a Static Random-Access Memory (SRAM), an Electrically-Erasable Programmable Read Only Memory (EEPROM), an Erasable Programmable Read Only Memory (EPROM), a Programmable read-only memory (PROM), a Read Only Memory (ROM), a magnetic memory, a flash memory, a magnetic or optical disk.

The power supply component 606 provides power to different components of the apparatus 600. The power supply component 606 may include a power management system, one or more power supplies, and other components associated with generating, managing, and distributing power for the apparatus 600.

The multimedia component 608 includes a screen providing an output interface between the apparatus 600 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense duration and a pressure associated with the touch or swipe. In some embodiments, the multimedia component 608 may include a front camera and/or a rear camera. The front camera and/or rear camera may receive external multimedia data when the apparatus 600 is in an operating mode, such as a photographing mode or a video mode. Each of the front camera and the rear camera may be a fixed optical lens system or have focal length and optical zooming capability.

The audio component 610 is configured to output and/or input an audio signal. For example, the audio component 610 includes a microphone (MIC). When the apparatus 600 is in an operating mode, such as a call mode, a recording mode, and a voice recognition mode, the MIC is to receive an external audio signal. The received audio signal may be further stored in the memory 604 or transmitted via the communication component 616. In some embodiments, the audio component 610 further includes a speaker to output an audio signal.

The I/O interface 612 may provide an interface between the processing component 602 and peripheral interface modules. The above peripheral interface modules may include a keyboard, a click wheel, buttons and so on. These buttons may include, but are not limited to, a home button, a volume button, a starting button and a locking button.

The sensor component 614 includes one or more sensors to provide status assessments of various aspects for the apparatus 600. For example, the sensor component 614 may detect the on/off status of the apparatus 600, and relative positioning of component, for example, the component is a display and a keypad of the apparatus 600. The sensor component 614 may also detect a change in position of the apparatus 600 or a component of the apparatus 600, a presence or absence of the contact between a user and the apparatus 600, an orientation or an acceleration/deceleration of the apparatus 600, and a change in temperature of the apparatus 600. The sensor component 614 may include a proximity sensor to detect the presence of a nearby object without any physical contact. The sensor component 614 may further include an optical sensor, such as a Complementary Metal Oxide Semiconductor (CMOS) or Charge-coupled Device (CCD) image sensor which is used in imaging applications. In some embodiments, the sensor component 614 may further include an acceleration sensor, a gyroscope sensor, a magnetic sensor, a pressure sensor, or a temperature sensor.

The communication component 616 is to facilitate wired or wireless communication between the apparatus 600 and other devices. The apparatus 600 may access a wireless network that is based on a communication standard, such as Wi-Fi, 2G or 3G, or a Combination thereof. In an embodiment, the communication component 616 receives a broadcast signal or broadcast-associated information from an external broadcast management system via a broadcast channel. In an embodiment, the communication component 616 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Blue Tooth (BT) technology and other technologies.

In an embodiment, the apparatus 600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above method.

In an embodiment, there is also provided a non-transitory computer readable storage medium including instructions, such as the memory 604 including instructions. The instructions may be executed by the processor 620 of the apparatus 600 to perform the above described methods. For example, the non-transitory computer readable storage medium may be a ROM, a Random Access Memory (RAM), a CD-ROM, a magnetic tape, a floppy disk, an optical data storage device, and the like.

With the method and apparatus for audio processing, the electronic device and the storage medium provided by the embodiments of the present disclosure, by obtaining an audio encoding result, in response to that an output result of an $i^{th}$ frame in a decoding path is a non-null character, the coordinate in the audio frame number dimension and the coordinate in the text label sequence dimension corresponding to an output position of the $i^{th}$ frame can be respectively increased by 1 to obtain an output position of a $(i+1)^{th}$ frame in the decoding path, wherein i is an integer greater than or equal to 1; finally, an output result corresponding to the output position of the $(i+1)^{th}$ frame in the decoding path can be determined according to the output result of the $i^{th}$ frame in the decoding path and an element of the $(i+1)^{th}$ frame in the audio encoding result. Compared with the method of switching to the output position of the next frame in two steps horizontally and vertically in the related art, the method of switching to the output position of the next frame in the diagonal way in the decoding path can reduce the amount of computation in the decoding process, improve the decoding efficiency, reduce the amount of computation and memory occupation of audio processing, realize parallel and fast calculation, and improve the practicability of the RNN-T technologies.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It should be understood that the present disclosure is not limited to the above described structures shown in the drawings, and various modifications and changes can be made to the present disclosure without departing from the scope thereof. The scope of the present disclosure is to be limited only by the appended claims.

The invention claimed is:

1. A method for processing audio, comprising:
    obtaining an audio encoding result, wherein the audio encoding result comprises a plurality of elements, and each element in the audio encoding result comprises a coordinate in an audio frame number dimension and a coordinate in a text label sequence dimension;
    in response to that an output result of an $i^{th}$ frame in a decoding path is a non-null character, respectively increasing the coordinate in the audio frame number dimension and the coordinate in the text label sequence dimension corresponding to an output position of the $i^{th}$ frame by 1 to obtain an output position of a $(i+1)^{th}$ frame in the decoding path, wherein i is an integer greater than or equal to 1; and
    determining an output result corresponding to the output position of the $(i+1)^{th}$ frame in the decoding path according to the output result of the $i^{th}$ frame in the decoding path and an element of the $(i+1)^{th}$ frame in the audio encoding result.

2. The method according to claim 1, further comprising:
in response to that the output result of the $i^{th}$ frame in the decoding path is a null character, increasing the coordinate in the audio frame number dimension corresponding to the output position of the $i^{th}$ frame by 1 to obtain the output position of the $(i+1)^{th}$ frame in the decoding path.

3. The method according to claim 2, wherein in response to that the output result of the $i^{th}$ frame in the decoding path is the non-null character, respectively increasing the coordinate in the audio frame number dimension and the coordinate in the text label sequence dimension corresponding to the output position of the $i^{th}$ frame by 1 to obtain the output position of the $(i+1)^{th}$ frame in the decoding path comprises:
when a number of the output position of the $i^{th}$ frame in the decoding path is 1, in response to that an output result of the $i^{th}$ frame in the decoding path is the non-null character, respectively increasing the coordinate in the audio frame number dimension and the coordinate in the text label sequence dimension corresponding to the output position of the $i^{th}$ frame by 1 to obtain the output position of the $(i+1)^{th}$ frame in the decoding path; or
wherein in response to that the output result of the $i^{th}$ frame in the decoding path is the null character, increasing the coordinate in the audio frame number dimension corresponding to the output position of the $i^{th}$ frame by 1 to obtain the output position of the $(i+1)^{th}$ frame in the decoding path comprises:
when the number of the output position of the $i^{th}$ frame in the decoding path is 1, in response to that the output result of the $i^{th}$ frame in the decoding path is the null character, increasing the coordinate in the audio frame number dimension corresponding to the output position of the $i^{th}$ frame by 1 to obtain the output position of the $(i+1)^{th}$ frame in the decoding path.

4. The method according to claim 2, wherein in response to that the output result of the $i^{th}$ frame in the decoding path is the non-null character, respectively increasing the coordinate in the audio frame number dimension and the coordinate in the text label sequence dimension corresponding to the output position of the $i^{th}$ frame by 1 to obtain the output position of the $(i+1)^{th}$ frame in the decoding path comprises:
in response to that an output result of an $i^{th}$ frame in a $n^{th}$ decoding path in N decoding paths is a non-null character, respectively increasing the coordinate in the audio frame number dimension and the coordinate in the text label sequence dimension corresponding to the output position of the $i^{th}$ frame by 1 to obtain an output position of a $(i+1)^{th}$ frame in the $n^{th}$ decoding path, wherein N is an integer greater than 1, and n is an integer greater than or equal to 1 and less than or equal to N; and
wherein in response to that the output result of the $i^{th}$ frame in the decoding path is the null character, increasing the coordinate in the audio frame number dimension corresponding to the output position of the $i^{th}$ frame by 1 to obtain the output position of the $(i+1)^{th}$ frame in the decoding path comprises:
in response to that an output result of an $i^{th}$ frame in a $n^{th}$ decoding path in N decoding paths is a null character, increasing the coordinate in the audio frame number dimension corresponding to the output position of the $i^{th}$ frame by 1 to obtain an output position of a $(i+1)^{th}$ frame in the $n^{th}$ decoding path.

5. The method according to claim 4, wherein determining the output result corresponding to the output position of the $(i+1)^{th}$ frame in the decoding path according to the output result of the $i^{th}$ frame in the decoding path and the element of the $(i+1)^{th}$ frame in the audio encoding result comprises:
determining an output result corresponding to the output position of the $(i+1)^{th}$ frame in the $n^{th}$ decoding path according to the output result of the $i^{th}$ frame in the $n^{th}$ decoding path and the element of the $(i+1)^{th}$ frame in the audio encoding result.

6. The method according to claim 5, wherein output results of previous i frames in the decoding path are character types and probability values corresponding to the character types, and the output result corresponding to the output position of the $(i+1)^{th}$ frame in the decoding path comprises a probability value of each character type; and
wherein after determining the output result corresponding to the output position of the $(i+1)^{th}$ frame in the $n^{th}$ decoding path according to the output result of the $i^{th}$ frame in the $n^{th}$ decoding path and the element of the $(i+1)^{th}$ frame in the audio encoding result, the method further comprises:
determining probability values of M candidate decoding branches formed by the $n^{th}$ decoding path according to output results of previous i frames and the output result corresponding to the output position of the $(i+1)^{th}$ frame in the $n^{th}$ decoding path, wherein each character type in the output result corresponding to the output position of the $(i+1)^{th}$ frame corresponds to a candidate decoding branch, and M is an integer greater than or equal to 1; and
reserving previous N decoding branches with the highest probability value in N×M candidate decoding branches formed by each of the N decoding paths and correspondingly updating the N decoding paths.

7. The method according to claim 6, wherein before reserving the previous N decoding branches with the highest probability value in the N×M candidate decoding branches formed by each of the N decoding paths and correspondingly updating the N decoding paths, the method further comprises:
deleting one or more null characters in each of the N×M candidate decoding branches formed by each of the N decoding paths to obtain a character string corresponding to the candidate decoding branch; and
merging two or more candidate decoding branches with the same character string, and determining a sum of probability values of two or more candidate decoding branches as a probability value of the merged candidate decoding branch.

8. The method according to claim 6, wherein the $(i+1)^{th}$ frame is a last frame in the audio frame number dimension; and
wherein after reserving the previous N decoding branches with the highest probability value in the N×M candidate decoding branches formed by each of the N decoding paths and correspondingly updating the N decoding paths, the method further comprises:
determining a target text according to a decoding path with the highest probability value in the N decoding paths.

9. The method according to claim 1, wherein obtaining the audio encoding result comprises:
encoding audio data to be processed through an encoder network of a neural network model to obtain the audio encoding result; or
wherein determining the output result corresponding to the output position of the $(i+1)^{th}$ frame in the decoding path according to the output result of the $i^{th}$ frame in the decoding path and the element of the $(i+1)^{th}$ frame in the audio encoding result comprises:
jointing the output result of the $i^{th}$ frame with the element of the $(i+1)^{th}$ frame in the audio encoding result through a joiner network of a neural network model to obtain a first joint result; and
decoding the first joint result through a decoder network of the neural network model to obtain the output result corresponding to the output position of the $(i+1)^{th}$ frame in the decoding path.

10. The method according to claim 9, further comprising:
inputting training audio data and a text label corresponding to the training audio data to the neural network model to obtain a second joint result output by the neural network model, wherein each element in the second joint result has a coordinate in the audio frame number dimension and a coordinate in the text label sequence dimension and a probability value of each character type;
determining all first training paths in the second joint result, wherein in each of the all first training paths, each frame corresponds to a serial number, in response to that an output result of an $i^{th}$ frame is a non-null character, the coordinate in the audio frame number dimension and the coordinate in the text label sequence dimension corresponding to an output position of the $i^{th}$ frame are respectively increased by 1 to obtain an output position of a $(i+1)^{th}$ frame, and in response to that the output result of the $i^{th}$ frame is a null character, the coordinate in the audio frame number dimension corresponding to the output position of the $i^{th}$ frame is increased by 1 to obtain the output position of the $(i+1)^{th}$ frame; and
adjusting network parameters of the neural network model according to a sum of probability values of the all first training paths.

11. The method according to claim 10, wherein determining the all first training paths in the second joint result comprises:
for training audio data with a preset ratio in all training audio data, determining the all first training paths in a second joint result of the training audio data with the preset ratio;
adjusting network parameters of the neural network model according to the sum of probability values of the all first training paths comprises:
adjusting the network parameters of the neural network model according to the all first training paths determined in a second joint result of each of the training audio data with the preset ratio; and
wherein the method further comprises:
for the all training audio data, determining all first training paths and all second training paths in a second joint result of the all training audio data, wherein in each of the all second training paths, each frame corresponds to a serial number, in response to that an output result of an $i^{th}$ frame is a non-null character, the coordinate in the text label sequence dimension corresponding to the output position of the $i^{th}$ frame is increased by 1 to obtain an output position of a $(i+1)^{th}$ frame, and in response to that the output result of the $i^{th}$ frame is a null character, the coordinate in the audio frame number dimension corresponding to the output position of the $i^{th}$ frame is increased by 1 to obtain the output position of the $(i+1)^{th}$ frame; and
adjusting the network parameters of the neural network model according to the all first training paths and the all second training paths determined in a second joint result of each of the all training audio data.

12. An electronic device, comprising a memory and a processor, wherein the memory is configured to store computer instructions executable on the processor, and when executing the computer instructions, the processor is configured to:
obtain an audio encoding result, wherein the audio encoding result comprises a plurality of elements, and each element in the audio encoding result has a coordinate in an audio frame number dimension and a coordinate in a text label sequence dimension;
in response to that an output result of an $i^{th}$ frame in a decoding path is a non-null character, respectively increase the coordinate in the audio frame number dimension and the coordinate in the text label sequence dimension corresponding to an output position of the $i^{th}$ frame by 1 to obtain an output position of a $(i+1)^{th}$ frame in the decoding path, wherein i is an integer greater than or equal to 1; and
determine an output result corresponding to the output position of the $(i+1)^{th}$ frame in the decoding path according to the output result of the $i^{th}$ frame in the decoding path and an element of the $(i+1)^{th}$ frame in the audio encoding result.

13. The electronic device according to claim 12, wherein the processor is further configured to:
in response to that the output result of the $i^{th}$ frame in the decoding path is a null character, increase the coordinate in the audio frame number dimension corresponding to the output position of the $i^{th}$ frame by 1 to obtain the output position of the $(i+1)^{th}$ frame in the decoding path.

14. The electronic device according to claim 13, wherein the processor is further configured to:
when a number of the output position of the $i^{th}$ frame in the decoding path is 1, in response to that an output result of the $i^{th}$ frame in the decoding path is the non-null character, respectively increase the coordinate in the audio frame number dimension and the coordinate in the text label sequence dimension corresponding to the output position of the $i^{th}$ frame by 1 to obtain the output position of the $(i+1)^{th}$ frame in the decoding path; or
wherein the processor is further configured to:
when the number of the output position of the $i^{th}$ frame in the decoding path is 1, in response to that the output result of the $i^{th}$ frame in the decoding path is the null character, increase the coordinate in the audio frame number dimension corresponding to the output position of the $i^{th}$ frame by 1 to obtain the output position of the $(i+1)^{th}$ frame in the decoding path.

15. The electronic device according to claim 13, wherein the processor is further configured to:
in response to that an output result of an $i^{th}$ frame in a $n^{th}$ decoding path in N decoding paths is a non-null character, respectively increase the coordinate in the audio frame number dimension and the coordinate in the text label sequence dimension corresponding to the output position of the $i^{th}$ frame by 1 to obtain an output position of a $(i+1)^{th}$ frame in the $n^{th}$ decoding path, wherein N is an integer greater than 1, and n is an integer greater than or equal to 1 and less than or equal to N; and wherein the processor is further configured to:

in response to that an output result of an $i^{th}$ frame in a $n^{th}$ decoding path in N decoding paths is a null character, increase the coordinate in the audio frame number dimension corresponding to the output position of the $i^{th}$ frame by 1 to obtain an output position of a $(i+1)^{th}$ frame in the $n^{th}$ decoding path.

16. The electronic device according to claim 15, wherein the processor is further configured to:

determine an output result corresponding to the output position of the $(i+1)^{th}$ frame in the $n^{th}$ decoding path according to the output result of the $i^{th}$ frame in the $n^{th}$ decoding path and the element of the $(i+1)^{th}$ frame in the audio encoding result.

17. The electronic device according to claim 16, wherein output results of previous i frames in the decoding path are character types and probability values corresponding to the character types, and the output result corresponding to the output position of the $(i+1)^{th}$ frame in the decoding path comprises a probability value of each character type; the processor is further configured to:

determine probability values of M candidate decoding branches formed by the $n^{th}$ decoding path according to output results of previous i frames and the output result corresponding to the output position of the $(i+1)^{th}$ frame in the $n^{th}$ decoding path, wherein each character type in the output result corresponding to the output position of the $(i+1)^{th}$ frame corresponds to a candidate decoding branch, and M is an integer greater than or equal to 1; and reserve previous N decoding branches with the highest probability value in N×M candidate decoding branches formed by each of the N decoding paths and correspondingly update the N decoding paths.

18. The electronic device according to claim 17, wherein the processor is further configured to:

delete one or more null characters in each of the N×M candidate decoding branches formed by each of the N decoding paths to obtain a character string corresponding to the candidate decoding branch; and merge two or more candidate decoding branches with the same character string, and determine a sum of probability values of two or more candidate decoding branches as a probability value of the merged candidate decoding branch.

19. The electronic device according to claim 17, wherein the $(i+1)^{th}$ frame is a last frame in the audio frame number dimension; the processor is further configured to:

determine a target text according to a decoding path with the highest probability value in the N decoding paths.

20. A non-transitory computer readable storage medium storing a computer program, wherein the computer program, when executed by a processor, causing the processor to:

obtain an audio encoding result, wherein the audio encoding result comprises a plurality of elements, and each element in the audio encoding result comprises a coordinate in an audio frame number dimension and a coordinate in a text label sequence dimension;

in response to that an output result of an $i^{th}$ frame in a decoding path is a non-null character, respectively increase the coordinate in the audio frame number dimension and the coordinate in the text label sequence dimension corresponding to an output position of the $i^{th}$ frame by 1 to obtain an output position of a $(i+1)^{th}$ frame in the decoding path, wherein i is an integer greater than or equal to 1; and determine an output result corresponding to the output position of the $(i+1)^{th}$ frame in the decoding path according to the output result of the $i^{th}$ frame in the decoding path and an element of the $(i+1)^{th}$ frame in the audio encoding result.

* * * * *